United States Patent [19]
Patton

[11] Patent Number: 5,448,361
[45] Date of Patent: Sep. 5, 1995

[54] ELECTRO-OPTICAL MICROMETER

[76] Inventor: Martin O. Patton, 4053 Elmore Rd., Fairview, Ohio

[21] Appl. No.: 97,078

[22] Filed: Jul. 23, 1993

[51] Int. Cl.$^6$ .............................................. G01B 11/02
[52] U.S. Cl. ..................................... 356/384; 356/381; 33/707
[58] Field of Search ............... 356/384, 385, 381, 382, 356/373, 375, 376; 250/560, 561; 33/707, 813, 784, 821, 823, 824, 828, 829, 818–820, 16, 791

[56] References Cited

U.S. PATENT DOCUMENTS

| | | | |
|---|---|---|---|
| 455,644 | 7/1891 | Sloane | 33/813 |
| 1,875,665 | 9/1932 | Schweizer | 356/382 |
| 2,441,317 | 5/1948 | Gribble | 33/813 |
| 2,549,566 | 4/1951 | Bentley et al. | 33/791 |
| 2,604,004 | 7/1952 | Root, III | 33/791 |
| 2,773,311 | 12/1956 | Kettler | 33/791 |
| 2,820,298 | 1/1958 | Bendt | 33/791 |
| 3,046,666 | 7/1962 | Mesich | 33/813 |
| 4,103,427 | 8/1978 | Ledley, III | 33/819 |
| 4,419,824 | 12/1983 | Oberhans | 33/813 |
| 4,459,749 | 7/1984 | Rieder et al. | 33/784 |
| 4,678,948 | 7/1987 | Schmitt | 307/511 |
| 4,736,313 | 4/1988 | Nishimura | 33/1 L |
| 4,798,469 | 1/1989 | Burke | 356/381 |
| 4,922,307 | 5/1990 | Schaffer | 356/384 |
| 5,231,469 | 7/1993 | Jeffers et al. | 356/373 |

FOREIGN PATENT DOCUMENTS 0106505  5/1988  Japan ..................................... 356/381

Primary Examiner—Hoa Q. Pham
Attorney, Agent, or Firm—Rankin, Hill, Lewis & Clark

[57] ABSTRACT

An electro-optical micrometer for measuring the thickness of a workpiece includes a fixture for holding the workpiece in a fixed position and a plunger that can be moved from a reference position to a second position indicative of the thickness of the workpiece. The plunger carries a spherical convex lens. A laser directs a beam of light against the lens and thereafter onto a sensor that can determine the linear displacement of the beam of light. The movement of the plunger can be correlated to linear displacements of the beam of light which, in turn, can be calculated and displayed by a computer.

12 Claims, 3 Drawing Sheets

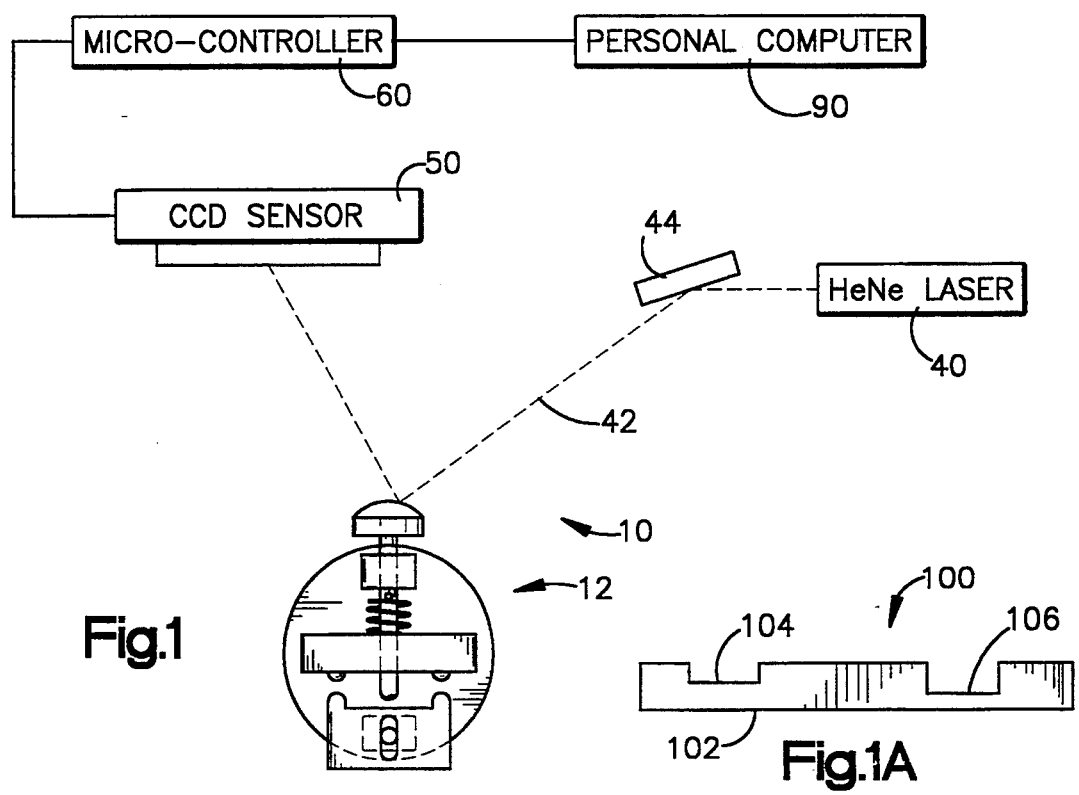
Fig.1
Fig.1A
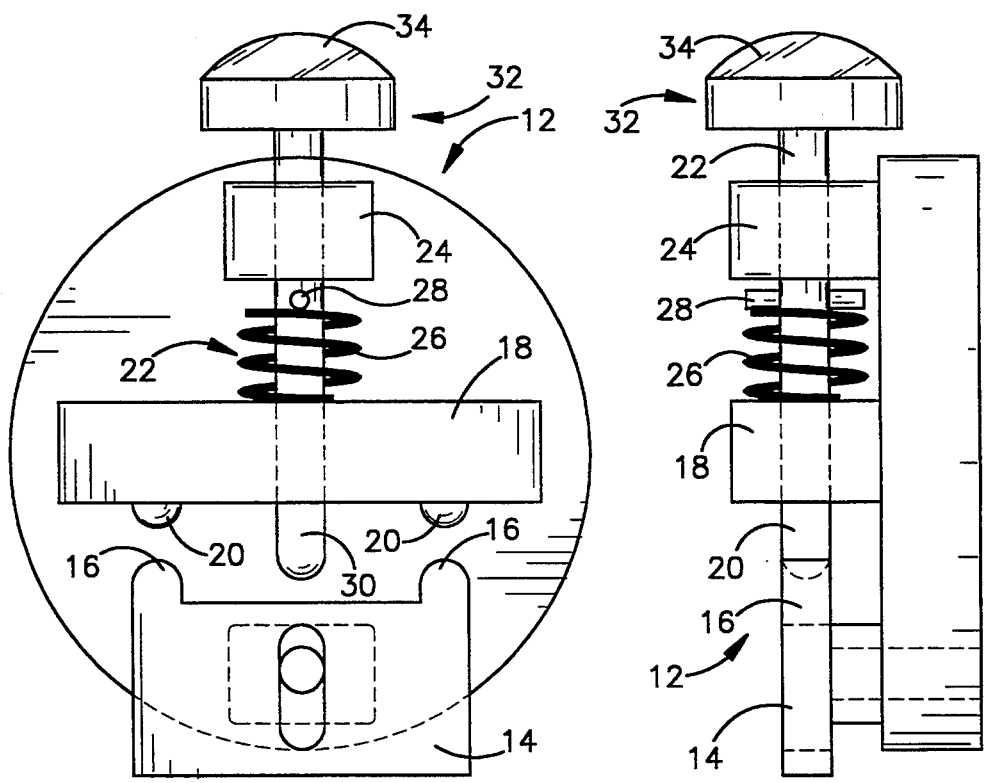
Fig.2
Fig.3

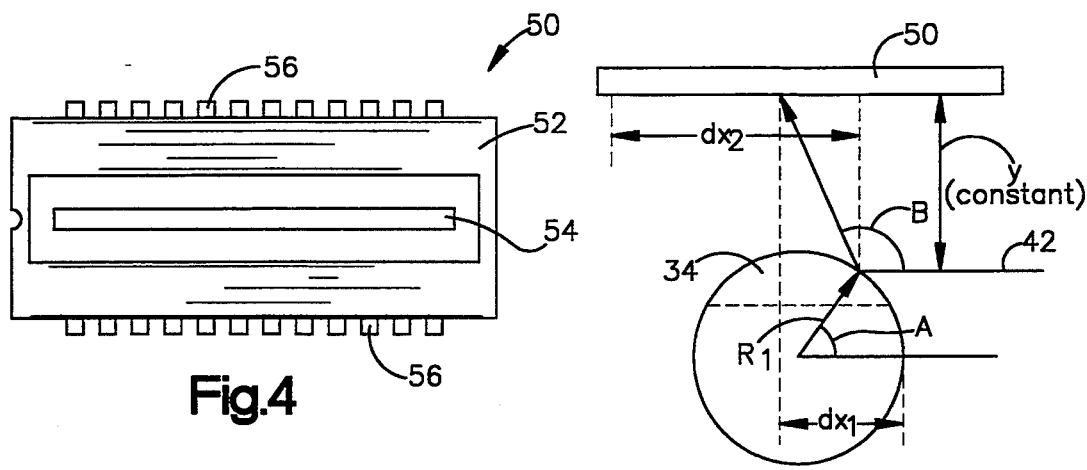
Fig.4
Fig.7
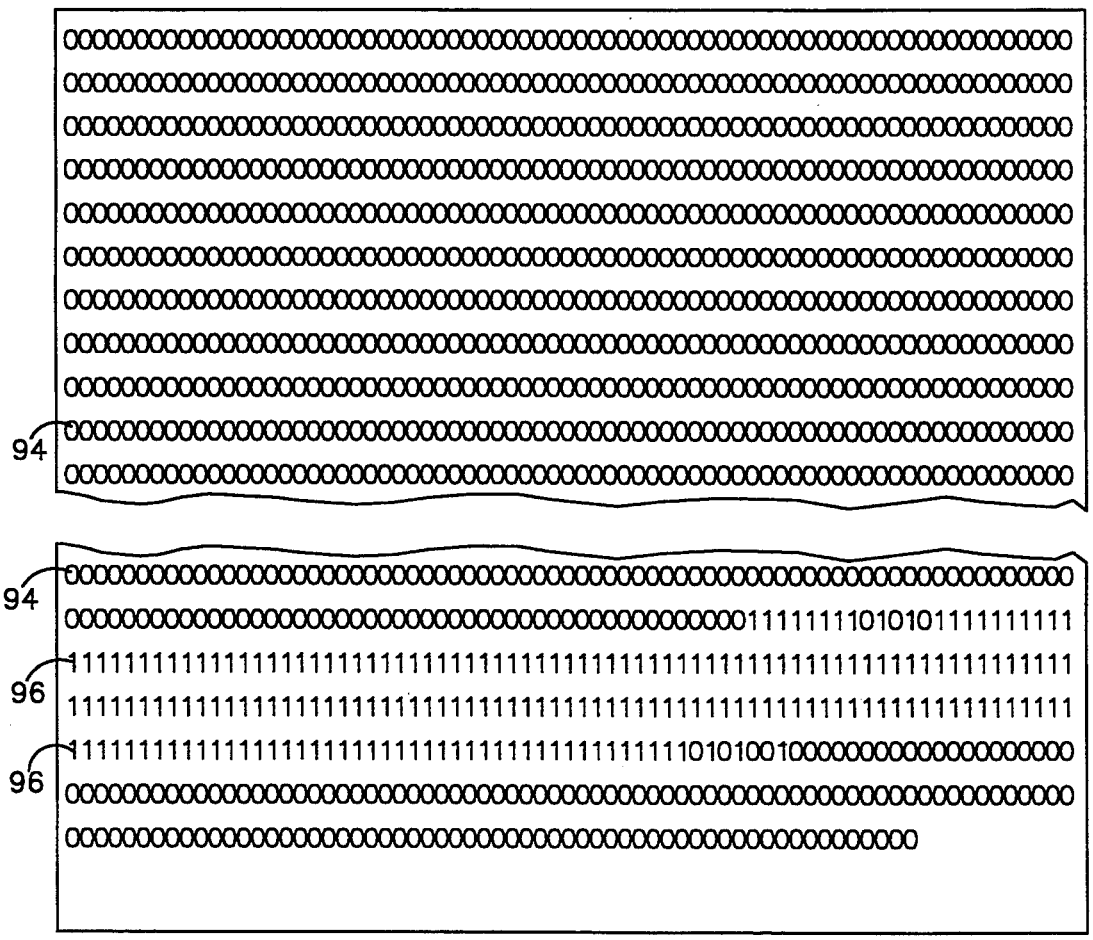
Fig.6

ELECTRO-OPTICAL MICROMETER

BACKGROUND OF THE INVENTION

1. Field of the Invention

The invention relates to micrometers and, more particularly, to an electro-optical micrometer capable of extreme accuracy.

2. Description of the Prior Art

Typical mechanical measuring devices such as micrometers, dial indicators and vernier calipers are suitable for making measurements that are accurate within thousandths of an inch. These devices are inexpensive, lightweight, compact, and relatively rugged. Accordingly, they are useful for many types of applications. Unfortunately, when greater accuracy of measurement is desired, these mechanical devices are inadequate.

In an attempt to increase the accuracy of thickness measurements, various optical and electro-optical micrometers have been developed. The patent to Bentley et al., U.S. Pat. No. 2,549,566, is an early example of an optical micrometer wherein a beam of light is reflected from a mirror and is directed through a transparent, semi-transparent, or translucent workpiece such as a plate of glass, plastics, or other, similar materials. An image of the workpiece is viewed through an eyepiece, which image is brought into focus by means of the adjustment of a micrometer. Due to the amplification permitted by the beam of light and the eyepiece, the accuracy of measurement of the micrometer is increased.

Unfortunately, the device is somewhat difficult to use in that it requires judgment on the part of the operator as to when the image is in proper focus. The focusing of the beam of light and the interpretation of the results are conducted in an entirely manual manner.

A similar device is disclosed in the patent to Kettler, U.S. Pat. No. 2,773,311, wherein a vertically movable rod compresses a workpiece against the upper surface of an anvil. The upper end of the rod carries a reticle. A lamp sends a beam of light through lenses, the reticle, and thereafter through an enlarging lens system. The light discharged by the enlarging lens system is directed to angled mirrors which in turn direct the beam of light onto a viewing screen. The thickness of the workpiece can be determined visually by observing where the beam of light falls on the viewing screen. Kettler claims that the markings on the reticle can be enlarged by a factor of 1,000 due to the particular magnification of the lens system and the positional arrangement of the mirrors relative to the viewing screen.

While such a device is believed to be an improvement over that disclosed by Bentley et al., in part because non-transparent objects can be measured and because less judgment is required in making a thickness measurement, the accuracy of the device nevertheless is not as great as desired.

Various other electro-optical measuring devices are known in which a light source directs a beam of light either through a lens system or against a mirror, or both. The characteristics or movement of the beam of light are analyzed in some manner to determine the thickness of an object or the relative position of an object. The patents to Root, U.S. Pat. Nos. 2,604,004, and Bendt, 2,820,298, compare the Newtonian fringes present in a light interference pattern to determine the thickness of an object. The patent to Rieder et al., U.S. Pat. No. 4,459,749, employs phototransisters that receive a reflected light signal and thereafter send signals to amplifying and evaluating circuitry as well as a microprocessor. The microprocessor provides a digital readout of the thickness of an object being measured. The patent to Schmitt, U.S. Pat. No. 4,678,948, is similar to the Rieder et al. device in that a light source sends optical signals to photosensors which in turn send amplified signals to AND gates and thereafter to a phase discriminator. By sending the light beam through a graduated scale and a graduated scanning plate (which are attached to two different objects), the relative position of the objects can be determined.

Despite the capabilities of the referenced devices, there remains a need for a micrometer capable of extreme accuracy. Desirably, any such micrometer would be relatively inexpensive, would require little or no judgment on the part of the operator in order to be utilized properly, and would enable objects of a wide variety of sizes and shapes to have their thicknesses determined quickly and accurately.

SUMMARY OF THE INVENTION

In response to the foregoing concerns, the present invention provides a new and improved electrical-optical micrometer capable of extreme accuracy on the order of fifty millionths of an inch. The micrometer according to the invention includes an anvil for holding a workpiece in a fixed position. A plunger having first and second ends is disposed adjacent the anvil such that the first end is adapted to contact the workpiece, with the plunger being movable from a first, reference position to a second, measuring position indicative of the thickness of the workpiece. A reflective surface is attached to the second end of the plunger. In the preferred embodiment, the reflective surface is in the form of a spherical, convex lens with one planar side.

A generating means for generating a beam of highly collimated light is disposed relative to the reflective surface such that the beam is reflected from the reflective surface as the plunger is moved from the first position to the second position. In the preferred embodiment, the generating means is in the form of a laser such as a helium- neon laser or a diode laser. The beam generated by the laser is extremely small, on the order of 0.5 millimeter in diameter.

A sensor is provided for receiving the beam of light reflected from the reflective surface. The sensor is disposed relative to the reflective surface such that the beam of light illuminates a path on the sensor as the plunger is moved from the first position to the second position. The sensor includes means for generating a first signal proportional to the length of the path illuminated by the beam of light. In the preferred embodiment, the sensor includes a plurality of light-sensitive picture elements or "pixels" spaced approximately 0.0125 millimeter apart. The number of pixels illuminated by the beam controls the value of the first signal. The first signal is an analog voltage.

A comparator is provided for receiving the signal from the sensor and correlating the value of the signal to the movement of the plunger between the first and second positions. The comparator generates a second signal indicative of the extent of movement of the plunger. In the preferred embodiment, the comparator is in the form of a micro-controller. The second signal is a digital voltage.

An output means is provided for receiving the signal generated by the comparator and for displaying a numeral indicative of the extent of movement of the plunger. In the preferred embodiment, the output means is in the form of a personal computer that includes magnetic disk storage for retaining a count of the number of pixels illuminated by the beam of light. The computer also includes a program that converts the number of illuminated pixels to a displayed numerical value indicative of the thickness of the workpiece being measured.

The micrometer according to the invention is capable of extreme accuracy, on the order of 50 millionths of an inch. The micrometer according to the invention is extremely accurate, in part because (1) the highly collimated beam of light is very small and has very little scatter, (2) the curvature provided by the reflective surface enables small movements of the plunger to result in large displacements of the reflected beam of light, and (3) the pixels are sufficiently light-sensitive that an accurate count of the illuminated pixels can be made easily. Also, because the pixels are very close together (in the preferred embodiment the pixel density is more than 2,000 per inch), it is possible to obtain a very accurate indication of the displacement of the reflected beam of light and, hence, the thickness of the object being measured.

The foregoing and other features and advantages of the invention are illustrated in the drawings and are described more fully in the specification and claims that follow.

BRIEF DESCRIPTION OF THE DRAWINGS

FIG. 1 is a schematic view of an electro-optical micrometer according to the invention showing the relative relationship of the components of the invention prior to conducting a thickness-measuring operation;

FIG. 1A is an enlarged side elevational view of a workpiece used to calibrate the micrometer of FIG. 1;

FIG. 2 is an enlarged from elevational view of an anvil, plunger, and reflective surface used as part of the micrometer according to the invention;

FIG. 3 is a side elevational view of the components illustrated in FIG. 2;

FIG. 4 is a view of the underside of a CCD sensor showing the portion thereof that is illuminated by a beam of light during a thickness-measuring operation;

FIG. 6 is a representation of a digital signal produced by the circuitry of FIG. 5 showing the results of a typical thickness-measurement operation; and FIG. 7 is a schematic representation of the reflective surface, CCD sensor, and beam of light showing the relative geometric relationship thereof.

DESCRIPTION OF THE PREFERRED EMBODIMENT

Figure 5:
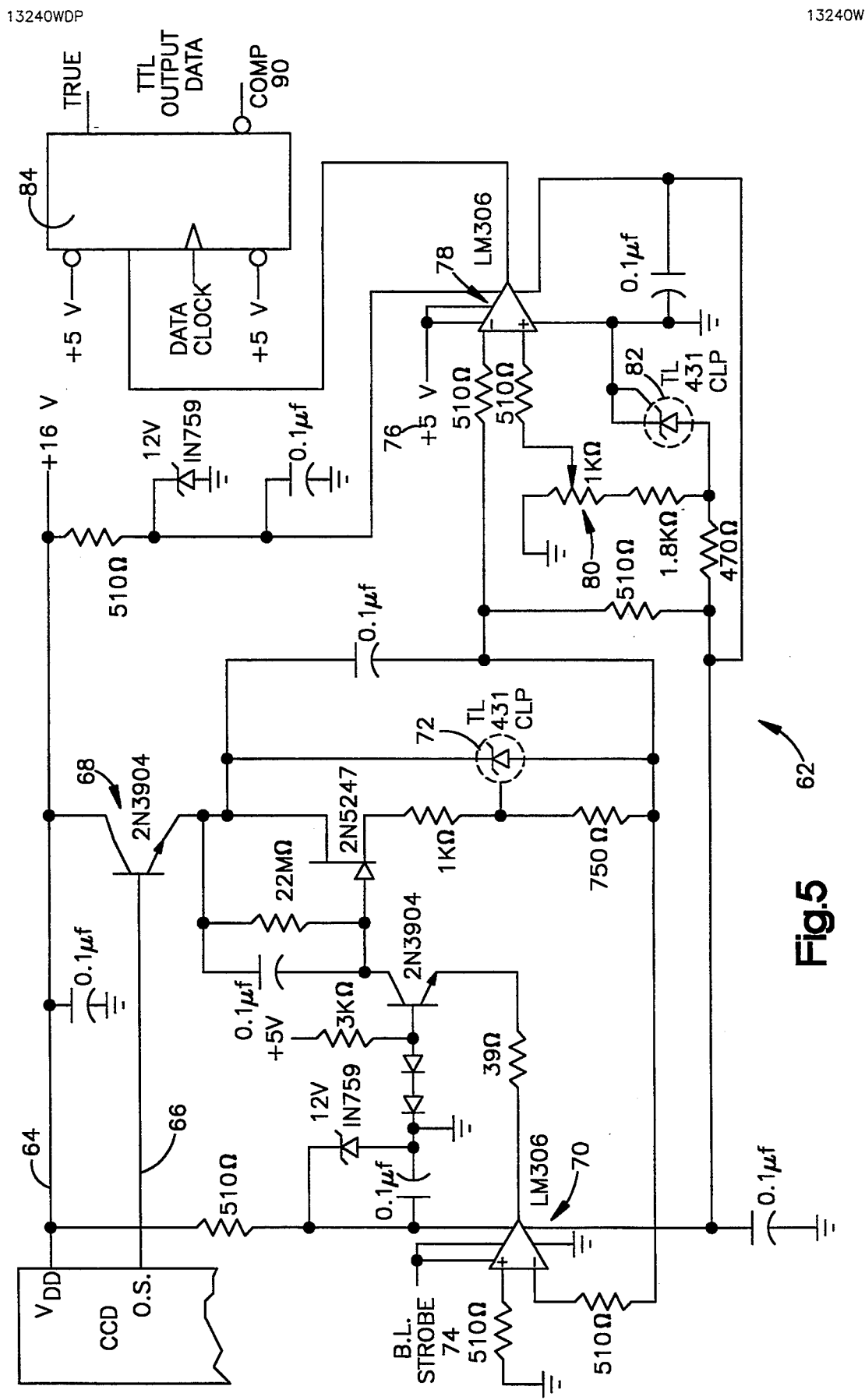
FIG. 5 is a schematic view of electrical circuitry employed as part of the invention for generating a digital signal indicative of the thickness of a workpiece.

Referring to FIG. 1, an electro-optical micrometer is indicated generally by the reference numeral 10. The micrometer 10 includes a fixture 12 for holding a workpiece whose thickness is to be measured, a laser 40 for generating a highly collimated beam of light 42, a sensor 50 for detecting the movement of the beam 42 and for sending a first signal in response thereto, a micro-controller 60 for processing signals transmitted by the sensor 50 and for sending second signals in response thereto, and a computer 90 for receiving the second signals and for calculating the thickness of the workpiece as a function of the value of the second signal.

The fixture 12 (FIGS. 1–3) includes an anvil 14 having spaced studs 16 projecting therefrom. A movable clamping jaw 18 is disposed adjacent the anvil 14. The jaw 18 includes spaced studs 20. The fixture 12 includes a plunger 22 that is movable within a guide 24. A spring 26 surrounds the plunger 22 and is disposed intermediate the upper surface of the anvil 14 and a pin 28 that extends through the plunger 22. The plunger 22 includes a first end 30 adapted to engage a workpiece, and a second end 32 to which a reflective surface in the form of a lens 34 that is planar on one side and convex on the other, i.e., plano-convex, is attached.

The lens 34 has a focal length of 24 millimeters. The lens 34 preferably is spherical and made of quartz or a similar substance.

The laser 40 is a helium-neon laser of 1 milliwatt output, commercially available from Spectra Physics Corp., Mountain View, Calif. The laser 40 generates a beam 42 having a diameter of about 0.5 millimeter. The beam 42 is highly collimated, expanding only to about 2.0 millimeters over 100 yards. In the environment of the present invention, the expansion of the beam 42 is negligible and any distortions in the shape of the reflected beam 42 can be accommodated easily by the circuitry to be described below.

Although the preferred embodiment employs a helium-neon laser 40, it also is possible to use diode laser. The most important consideration is that the beam 42 emitted by the laser 40 be small in diameter and highly collimated, that is, with highly parallel rays and little scatter.

The beam 42 from the laser 40 is reflected by a mirror 44 onto the lens 34. Thereafter, the beam 42 is directed onto a charge-coupled device (CCD) sensor 50. CCD sensors are well known, in particular for theft utility as sensors in telecopiers and optical character recognition (OCR) devices. A suitable CCD sensor 50 can be obtained from Texas Instruments, Dallas, Tex. 75265, Model No. TC103.

The CCD sensor 50 operates through a line of photosensitive sensor elements 54, called photosites or pixels. Photons from the light environment, whether from an image being scanned or an incident laser beam 42 as in the present invention, create electron/hole pairs in a silicon single crystal (not shown). While the holes are swept into the substrate, the electrons collect in the pixels 54 as a linear function of the incident light and exposure time. Charge packets accumulated in the pixels 54 are transferred to a first zener diode 72 (see FIG. 5) whose potential changes linearly with the signal charge delivered. This potential is applied to an amplifier 68 to produce an output signal (O.S.). Referring particularly to FIG. 4, the sensor 50 includes a body portion 52 having longitudinally extending pixels 54 on one surface thereof. A plurality of terminals 56 extend from the sides of the body portion 52 for appropriate connection to the micro-controller 60.

The sensor 50 includes one line of 2,048 pixels 54. The pixels 54 are spaced 0.0125 millimeter apart on center. With the sensor 50 spaced 24 millimeters from the lens 34, the reflected beam 42 is displaced in a linear path twenty pixels 54 for every one-thousandth of an inch movement of the plunger 22.

The sensor 50 is connected to the micro-controller 60. Referring particularly to FIG. 5, reference numeral 62 indicates an electrical circuit employed by the microcontroller 60. The circuit 62 is a comparator circuit that performs an analog-to-digital converter function. That is, analog signals are received from the sensor 50, which signals are converted to digital output signals upon the occurrence of certain events, as will be described.

The circuit 62 can be constructed by referring to a publication of Texas Instruments, Dallas Tex. 75265, entitled "Optoelectronics and Image Sensors Data Book," pages 7-33 through 7-37, FIG. 8(1990). The values of various circuit components such as capacitors and resistors and the identification of commercially available components such as transistors and amplifiers, are shown in FIG. 5. An overall description of the operation of the circuit 62 follows.

A lead line 64 provides input voltage ($V_{DD}$) in order to drive the sensor 50. An output signal (O.S.) is directed via a lead line 66 to a transistor 68. A first comparator 70 receives the output signal from the sensor 50. A first zener diode 72 sets the threshold voltage level at which signals are sent to the first comparator 70. A black-level strobe 74 provides an indication to the first comparator 70 whenever the pixels 58 included as part of the sensor 50 are activated. A voltage source 76 provides a reference voltage on the order of 5.0 volts against which signals from the sensor 50 are compared. A second comparator 78 receives signals from the first comparator 70 if a threshold voltage controlled by a rheostat 80 and a second zener diode 82 are exceeded. The output from the second comparator 78 is directed to a signal generator 84. A data clock 86 performs a counting function of signals directed to the signal generator 84. The output from the signal generator 84 is a data stream of binary output (ones and zeros). The output from the signal generator 82 is sent to the computer 90 by means of a standard serial interface. The data stream is recorded as a 2048 byte file on a magnetic disk or other storage medium included as part of the computer 90.

As will be apparent from the foregoing description and from a review of FIG. 5, activation of the pixels 54 included as part of the sensor 50 results in the generation of analog signals which are received by the first comparator 70. The first comparator 70 and second comparator 78 produce a digital binary signal in the form of ones and zeros. Accordingly, the signals transmitted by the signal generator 84 represent an indication in binary coded form of the number of pixels 54 that have been activated by the beam 42. Because the number of pixels 54 that have been activated is a function of the movement of the beam 42, and because the movement of the beam 42 is a function of the displacement of the plunger 22, the signals transmitted by the signal generator 84 can be correlated with the thickness of the workpiece being measured. The computer 90 can be programmed readily to provide a visual or printed display of the resultant thickness measurement.

Referring to FIG. 6, a typical data file created in the computer 90 by the signal generator 84 is shown. The zeros (reference numeral 94) represent parts of the sensor 50 that are not illuminated by the beam 42. The ones (reference numeral 96) represent parts of the sensor 50 that have been illuminated by the beam 42. A data file as shown in FIG. 6 contains 2,048 pieces of information (represented by ones 96 or zeros 94) corresponding to the number of pixels 54 included as part of the sensor 50.

A typical data file contains a continuous sequence of ones 96 indicative of the displacement of the beam 42 across the face of the sensor 50. Although the pixels 54 are very accurate in responding to an impinging beam 42, a typical data file shows some "ringing" at the beginning or end of the path illuminated by the beam 42. Ringing may be caused by internal reflections in the sensor 50, reflections from dust in the path of the beam 42 that occur at the time of measurement, or distortions in the shape of the beam 42 as it approaches the extreme ends of its path (e.g., a circular impinging beam 42 will transition into an elliptical impinging beam 42 as displacement across the face of the sensor 50 occurs). It has been found that ringing can be accommodated by considering that the leading edge of the beam 42 is signalled when two consecutive ones 96 are displayed, and that the trailing edge of the beam 42 is signalled when two consecutive zeros 94 are displayed. Accordingly, those leading and trailing edge indications are readily programmed into the signal processing logic.

In order to correlate the vertical movement of the plunger 22 to the number of pixels 54 illuminated, the mathematical relationship among the various elements of the invention must be computed by the computer 90. Referring to FIG. 7, the radius of the spherical lens 34 is indicated as $R_1$. Angle B is the angle inclusive of incidence and reflection followed by the laser beam 42. Angle A is the angle by which the point of incidence of the laser beam 42 departs from normal to the surface of the lens 34. The distance X is the linear displacement of the point of impingement of the laser beam 42 on the sensor 50. The distance Y is the lateral distance between the laser 40 and the sensor 50. The lateral distance Y is assumed to a constant for purposes of the present invention.

The total deflection of the beam 42 (dimension X) on the sensor 50 is the total of the deflection caused by where the beam 42 hits the sensor 50 plus the deflection caused by the angle of reflection from the vertically movable lens 34. The equation for the amount of total deflection can derived as follows:

1. $B = 2A$
2. $\sin A = R_1/dY$
3. $A = \arcsin(R_1/dY)$
4. $dX_{Total} = dX_1 + dX_2$
5. $dX_1 = R_1 \cos A$
6. $dX_2 = Y \cdot |\tan(90-B)|$
7. $dX = R_1 \cos A + Y \cdot |\tan(90-B)|$ After solving the foregoing equations to establish the total deflection of the beam 42, the computer 90 either can display the total deflection or it can display a number directly indicative of the thickness of the part being measured.

Calibration and Operation

Referring now to FIG. 1A, a calibration strip for the micrometer 10 is indicated by the reference numeral 100. The calibration strip 100 approximates a so-called Almen strip used in industrial metal conditioning processes to gage the intensity of shot peening. In use, an Almen strip is clamped flat in a holder, is exposed to the shot peening environment along with the product being processed. When the strip is removed from its holder, stresses induced by the shot peening cause the strip to bend in proportion to the intensity of the shot peening process. The bend, or arc-height, of the strip can be measured with a dial indicator. Measurements of the arc-height of the strip can be correlated with the intensity of the shot peening process. Although the present invention is not limited to measuring arc-heights of Almen strips, nevertheless its calibration and demonstration in such an environment is illustrative of one use which may be made of the invention.

As indicated, the workpiece 100 has the dimensions of a typical Almen strip, that is, approximately 3.0 inches in length by 0.5 inch in width. The strip 100 is flat on one face 102, but includes on its other face a first slot 104 that has a depth of about 0.010 inch, and a second slot 106 having a depth of about 0.020 inch.

In calibrating the micrometer 10, the strip 100 is inserted between the anvil 14 and the jaw 18 and is held in place there by means of the studs 16, 20. The first end 30 of the plunger 22 contacts the flat face 102 in order to establish a zero, or reference, position. The various elements of the invention are arranged such that the beam 42 falls on the right edge of the sensor 50 as shown in FIG. 1.

After a zero position has been established, the jaw 18 is separated from the anvil 14 and the workpiece 100 is inverted so that the plunger 22 contacts first the smallest slot 104, and then the largest slot 106. In each instance, the beam 42 is displaced laterally (to the left as viewed in FIG. 1) along the face of the sensor 50. Data files similar to that shown in FIG. 6 are generated.

In order to properly calibrate the micrometer 10, the foregoing procedure is repeated five times. The results of representative calibration test runs are summarized below:

TABLE 1

| Arc-Height | (sd = standard deviation) | | |
|---|---|---|---|
| | Pixels On | Pixels Off | Center Pixel |
| 0.000 | 1688, sd 7.55 | 1898, sd 9.56 | 1793, sd 8.47 |
| 0.010 | 1493, sd 2.94 | 1695, sd 5.35 | 1594, sd 4.10 |
| 0.020 | 1176, sd 2.71 | 1382, sd 1.26 | 1279, sd 1.91 |

The calibration test indicates that the micrometer 10 has excellent precision and repeatability. The largest sample standard deviation was about 0.5 percent, while the smallest standard deviation was about 0.1 percent. The resolution, or accuracy, of the calibration measurement is excellent, ranging from 19,950 parts per inch to 31,700 parts per inch. As can be seen from Table 1, and as suggested by equation 8, the displacement of the laser beam 42 along the face of the sensor 50 is non-linear. For example, 195 pixels were illuminated as the beam 42 moved from the reference point to the ten-thousandths of an inch arc-height. However, in moving from the ten-thousandths inch arc-height to the twenty-thousandths arc-height, 317 pixels were illuminated.

As will be apparent, the micrometer 10 also can be used to measure the thickness of parts, as well as the absence of thickness of parts. In such a circumstance, the left side of the sensor 50 (as viewed in FIG. 1) could be used as reference point, and subsequent vertical movements of the plunger 22 indicative of increasing thickness of a workpiece would cause the beam 42 to be moved to the right as viewed in FIG. 1. Regardless of how the micrometer 10 is calibrated, it will provide an excellent measure of the displacement of the plunger 22 due to the accuracy by which the pixels can be counted and due to the optical gain provided by the movable spherical lens 34.

As will be appreciated from the foregoing description, the micrometer 10 can be scalable to measure large or small distances, and amplification of small displacements can be varied merely by changing the curvature of the spherical lens 34. Lenses 34 of smaller or larger focal length can be used. In making such changes, however, the relationship of the movement of the plunger 22 with the non-linearity of illumination of the pixels must be calculated in order for accurate thickness measurements to be possible.

Although the invention has been disclosed in its preferred form with a certain degree of particularity, it will be understood that the present disclosure of the preferred embodiment has been only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. An electro-optical micrometer for measuring the thickness of a workpiece, comprising:
    means for holding the workpiece in a fixed position;
    a plunger having first and second ends, the first end containing contact means for contacting the workpiece, the plunger being movable from a first, reference position to a second, measuring position indicative of the thickness of the workpiece;
    a reflective surface in the form of a plano-convex lens attached to the second end of the plunger;
    generating means for generating a beam of highly collimated light, said generating means being disposed relative to the reflective surface such that the beam is reflected from the reflective surface as the plunger is moved from the first position to the second position;
    a sensor for receiving the beam of light reflected from the reflective surface, the sensor being disposed relative to the reflective surface such that the beam of light illuminates a path on the sensor as the plunger is moved from the first position to the second position, the sensor including means for generating a first signal proportional to the length of the path on the sensor illuminated by the beam of light;
    comparator means for receiving the first signal from the sensor and comparing the value of the first signal with a predetermined reference value, the comparator means generating a second signal when the first signal exceeds the predetermined reference value; and
    calculator means for receiving the second signal generated by the comparator means and calculating a numerical value indicative of the extent of movement of the plunger as a function of the value of the second signal.

2. The micrometer of claim 1, wherein the generating means is a laser.

3. The micrometer of claim 1, wherein the laser generates a beam having a diameter of about 0.5 mm.

4. The micrometer of claim 1, wherein the beam is reflected from the reflective surface in a linear path.

5. The micrometer of claim 1, wherein the sensor is in the form of a charge-coupled detector that employs light-sensitive pixels.

6. The micrometer of claim 5, wherein about 2048 pixels are provided, each pixel being spaced about 0.0125 mm from laterally adjacent pixels as measured from the center of each pixel.

7. The micrometer of claim 1, wherein the first signal is an analog voltage, and the second signal is a digital data stream of ones and zeros.

8. The micrometer of claim 1, wherein said calculator means is a personal computer that receives and stores the second signal.

9. The micrometer of claim 8, further comprising a program included as part of the computer that calculates the extent of movement of the plunger as a function of the value of the second signal, and displays the extent of movement so calculated.

10. An electro-optical micrometer for measuring the thickness of a workpiece, comprising:

means for holding the workpiece in a fixed position;

a plunger having first and second ends, the first end containing contact means for contacting the workpiece, the plunger being movable from a first, reference position to a second, measuring position indicative of the thickness of the workpiece;

a reflective surface attached to the second end of the plunger, the reflective surface being in the form of a plano-convex lens having a focal length of about 24 mm;

a laser for generating a beam of highly collimated light having a diameter of about 0.5 mm, the laser being disposed relative to the lens such that the beam is reflected from the lens as the plunger is moved from the first position to the second position;

a charge-coupled detector for receiving the beam of light reflected from the lens, the detector being disposed relative to the lens such that the beam of light illuminates a path on the detector as the plunger is moved from the first position to the second position, the detector including means for generating a first signal proportional to the length of the path on the detector illuminated by the beam of light;

a comparator for receiving the first signal from the detector and comparing the value of the first signal with a predetermined reference value, the comparator generating a second signal when the first signal exceeds the predetermined reference value; and a computer for receiving the second signal generated by the comparator and calculating a numerical value indicative of the extent of movement of the plunger as a function of the value of the second signal, the computer displaying the numerical value so calculated.

11. The micrometer of claim 10, wherein the detector employs light-sensitive pixels, and wherein about 2048 pixels are provided, each pixel being spaced about 0.0125 mm from laterally adjacent pixels as measured from the center of each pixel.

12. The micrometer of claim 10, wherein the first signal is an analog voltage, and the second signal is a digital data stream of ones and zeros.

* * * * *